United States Patent
Kinsey

(10) Patent No.: US 12,168,398 B2
(45) Date of Patent: Dec. 17, 2024

(54) SYSTEMS AND METHODS FOR RETRACTING A CHARGING CABLE OF AN ELECTRIC VEHICLE CHARGING STATION

(71) Applicant: Volta Charging, LLC, San Francisco, CA (US)

(72) Inventor: Jeffrey Kinsey, San Francisco, CA (US)

(73) Assignee: Volta Charging, LLC, San Francisco, CA (US)

( * ) Notice: Subject to any disclaimer, the term of this patent is extended or adjusted under 35 U.S.C. 154(b) by 482 days.

(21) Appl. No.: 17/521,696

(22) Filed: Nov. 8, 2021

(65) Prior Publication Data

US 2022/0144110 A1 May 12, 2022

Related U.S. Application Data

(60) Provisional application No. 63/111,452, filed on Nov. 9, 2020.

(51) Int. Cl.
*H02J 7/00* (2006.01)
*B60L 53/18* (2019.01)
*B60L 53/37* (2019.01)

(52) U.S. Cl.
CPC ............. *B60L 53/18* (2019.02); *B60L 53/37* (2019.02)

(58) Field of Classification Search
USPC ......................................................... 320/109
See application file for complete search history.

(56) References Cited

U.S. PATENT DOCUMENTS

| | | | |
|---|---|---|---|
| 2010/0241299 A1* | 9/2010 | Ito | B60L 53/18 |
| | | | 320/109 |
| 2011/0074351 A1* | 3/2011 | Bianco | B60L 53/31 |
| | | | 320/109 |

(Continued)

FOREIGN PATENT DOCUMENTS

| | | |
|---|---|---|
| GB | 2499570 A | 8/2013 |
| GB | 2509720 A | 7/2014 |

(Continued)

OTHER PUBLICATIONS

CN-103514664-A Machine Translation (Year: 2014).*
Volta Charging, LLC, International Search Report and Written Opinion, PCT/US2021/058391, Feb. 25, 2022, 11 pgs.

*Primary Examiner* — Samuel Berhanu
(74) *Attorney, Agent, or Firm* — Morgan, Lewis & Bockius LLP

(57) ABSTRACT

The disclosed embodiments provide systems and methods for retracting a charging cable at an electric vehicle charging station (EVCS). The EVCS includes a housing, a charging cable configured to provide an electric current to charge a battery of an electric vehicle, a sensor for detecting whether external objects are within a predefined region proximal to the housing, a motor configured to retract at least a portion of the charging cable, and a controller electrically coupled to both the sensor and the motor. The method includes energizing the motor, via the controller, to retract at least a portion of the charging cable when retraction criteria are met. The retraction criteria include criteria that are met when the charging cable is not coupled to a vehicle and the one or more sensors do not detect an external object in the predefined region proximal to the housing.

18 Claims, 15 Drawing Sheets

(56) References Cited

U.S. PATENT DOCUMENTS

2014/0077761 A1     3/2014   Hamrin et al.
2016/0101701 A1     4/2016   Wu et al.

FOREIGN PATENT DOCUMENTS

| WO | WO 2009/091745 A2 | 7/2009 | |
|---|---|---|---|
| WO | WO 2014/209261 A1 | 12/2014 | |
| WO | WO-2017221207 A1 * | 12/2017 | ............ B60L 53/14 |
| WO | WO 2019/038442 A1 | 2/2019 | |

* cited by examiner

SYSTEMS AND METHODS FOR RETRACTING A CHARGING CABLE OF AN ELECTRIC VEHICLE CHARGING STATION

PRIORITY APPLICATION

This application claims priority to U.S. Prov. App. No. 63/111,452, filed Nov. 9, 2020, which is hereby incorporated by reference in its entirety.

TECHNICAL FIELD

This application relates generally to electric vehicle charging stations, and more particularly, to retracting a charging cable and returning the charging cable to an electric vehicle charging station.

BACKGROUND

Electric vehicle charging stations (EVCSs) typically use charging cables to provide an electrical current and charge a battery of an electric vehicle. Typically, a user is responsible for connecting the charging cable to the electric vehicle and returning it to the charging station. At times, a user may not remember to return the charging cable, may incorrectly return the charging cable to the charging station, or toss the charging cable to the ground. When the charging cable is left on the ground, it can be damaged by foot traffic or other vehicles driving over it. Additionally, the charging cable, if left on the ground, can create a tripping hazard for others in the area near the charging station.

SUMMARY

The disclosed implementations provide electric vehicle charging stations (EVCSs) that retract at least a portion of the charging cable. The EVCSs protect the charging cables from being damaged and reduce the risk to people by removing the charging cables from the ground. The various implementations described herein do so using one or more sensors to detect external objects in their proximity. For example, by using one or more sensors, EVCSs can be used to detect people, animals, shopping carts, cars, and/or other objects. After determining that there are no external objects in their proximity, the EVCSs will energize motors to safely retract at least a portion of their charging cables. By using detecting objects within their vicinity, the EVCSs provided herein can retract at least a portion of their charging cables without entangling around external objects, tripping people, or being left on the ground where they may be damaged.

To that end, in accordance with some implementations, a method for retracting a charging cable of an EVCS is performed at the EVCS. The EVCS includes a housing, a charging cable configured to provide an electric current to charge a battery of an electric vehicle, one or more sensors for detecting whether external objects are within a predefined region proximal to the housing, a motor configured to retract at least a portion of the charging cable (e.g., into the housing), and a controller electrically coupled to both the one or more sensors and the motor. The method includes energizing the motor, via the controller, to retract at least a portion of the charging cable (e.g., into the housing) when retraction criteria are met. The retraction criteria include criteria that are met when the charging cable is not coupled to a vehicle and the one or more sensors do not detect an external object in the predefined region proximal to the housing.

Some implementations of the present disclosure provide a computer system (e.g., a server system), comprising one or more processors and memory storing one or more programs. The one or more programs store instructions that, when executed by the one or more processors, cause the computer system to perform any of the methods described herein.

Some implementations of the present disclosure provide a non-transitory computer readable storage medium storing instructions that, when executed by a computer system having one or more processors, cause the computer system to perform any of the methods described herein.

Again, these systems and methods reduce or eliminate the potential tripping hazard generated by the charging cable. Additionally, the systems and methods reduce the need for repairing charging cables by ensuring that they are properly returned to a charging station. The implementations described herein can retract the charging cable (e.g., into the housing) in a safe and efficient manner.

BRIEF DESCRIPTION OF THE DRAWINGS

For a better understanding of the various described implementations, reference should be made to the Detailed Description below, in conjunction with the following drawings in which like reference numerals refer to corresponding parts throughout the Figures.

DETAILED DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Many modifications and variations of this disclosure can be made without departing from its spirit and scope, as will be apparent to those skilled in the art. The specific implementations described herein are offered by way of example only, and the disclosure is to be limited only by the terms of the appended claims, along with the full scope of equivalents to which such claims are entitled.

Figure 1:
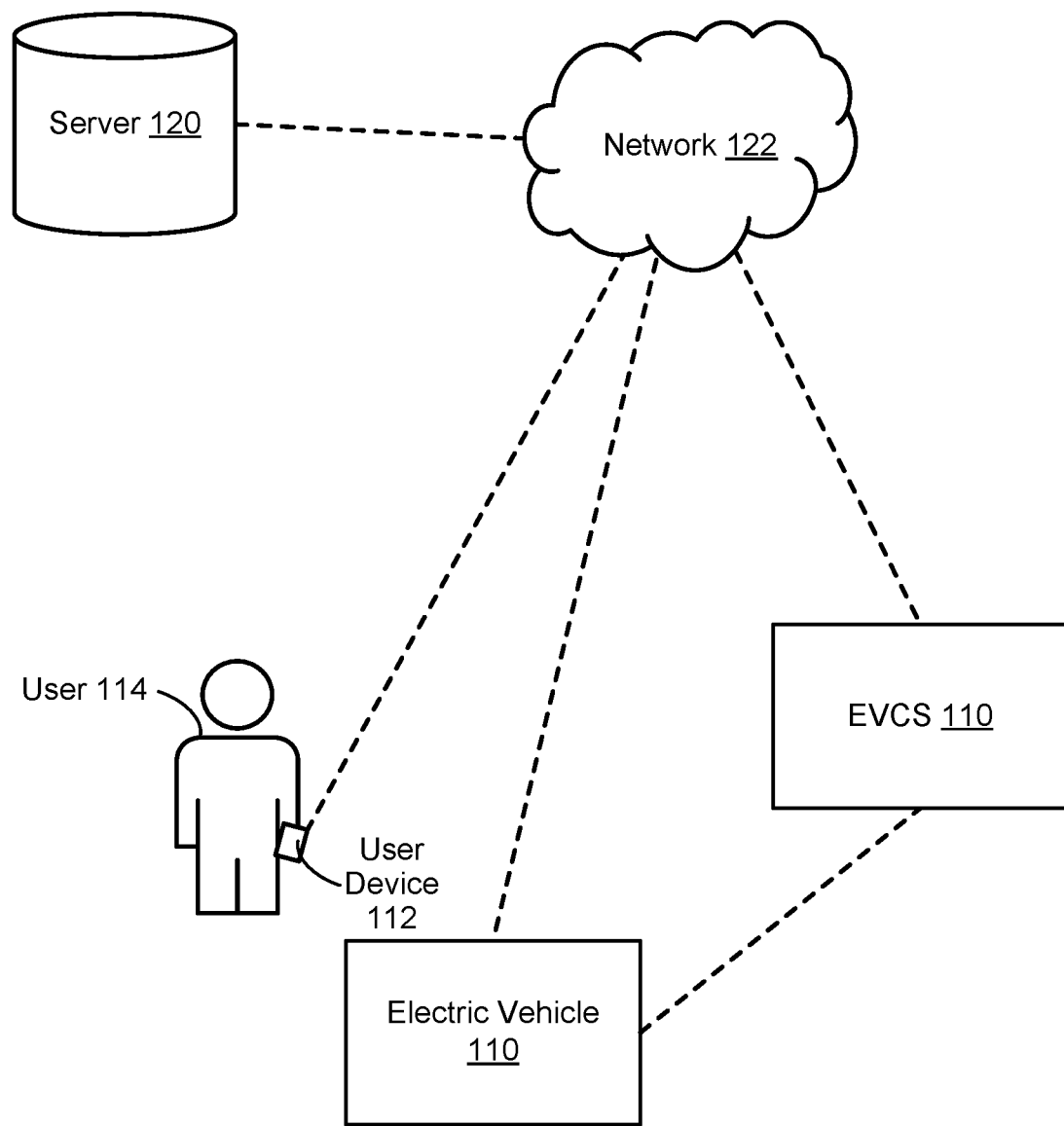
FIG. 1 illustrates a system for charging an electric vehicle in accordance with some implementations.

FIG. 1 illustrates an electric vehicle charging station (EVCS) 100 that is configured to provide an electric charge to an electric vehicle 110 via one or more electrical connections. In some implementations, the EVCS 100 provides an electric charge to electric vehicle 110 via a wired connection, such as charging cable. Alternatively, the EVCS 100 may provide an electric charge to electric vehicle 110 via a wireless connection (e.g., wireless charging). In some implementations, the EVCS 100 may be in communication with the electric vehicle 110 or a user device 112 belonging to a user 114 (e.g., a driver, passenger, owner, renter, or other operator of the electric vehicle 110) that is associated with the electric vehicle 110. In some implementations, the EVCS 100 communicates with one or more devices or computer systems, such as user device 112 or server 120, respectively, via a network 122.

Figure 2A:
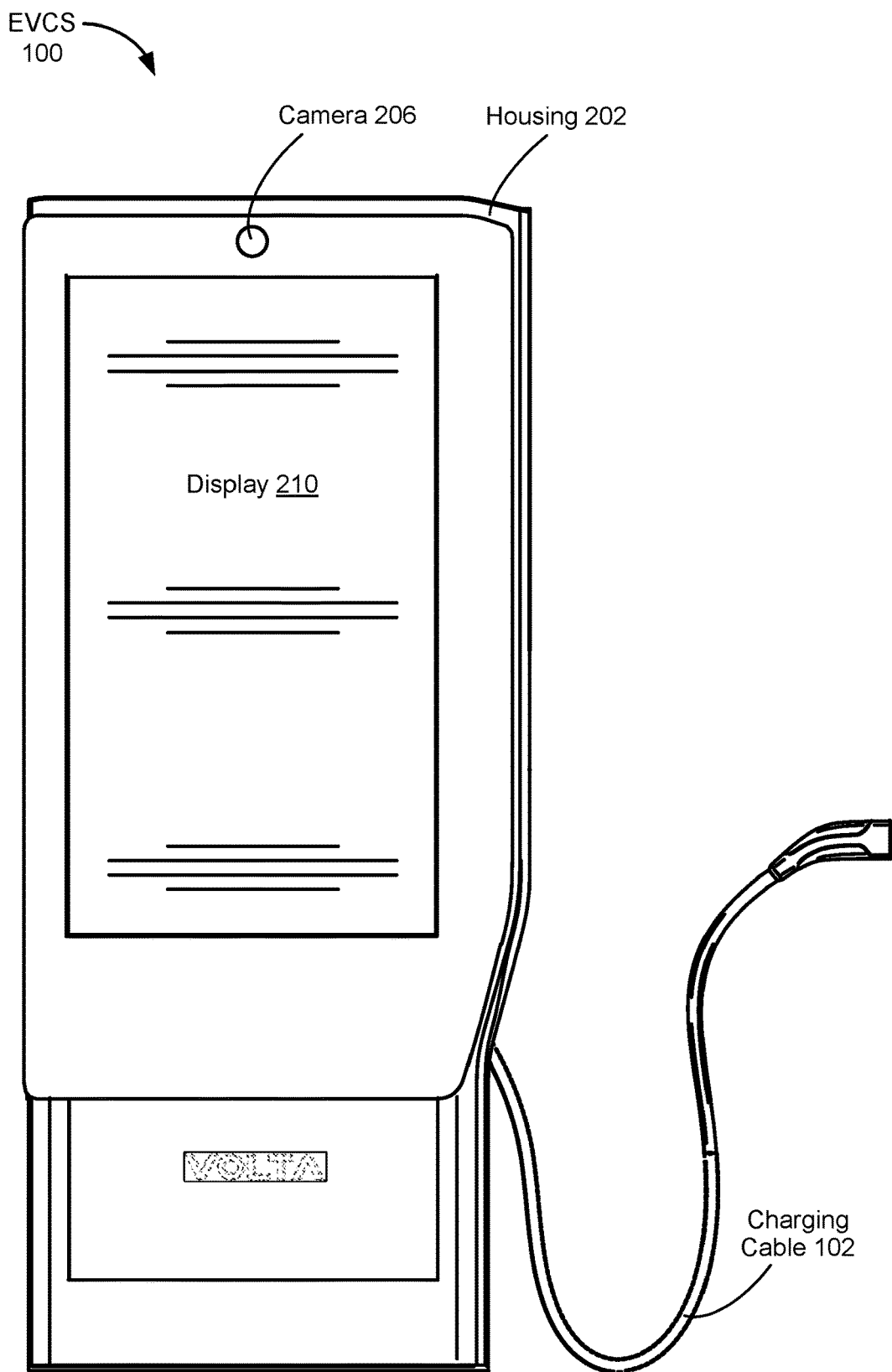
FIGS. 2A-2C illustrate a charging station for an electric vehicle in accordance with some implementations.
Figure 2B:
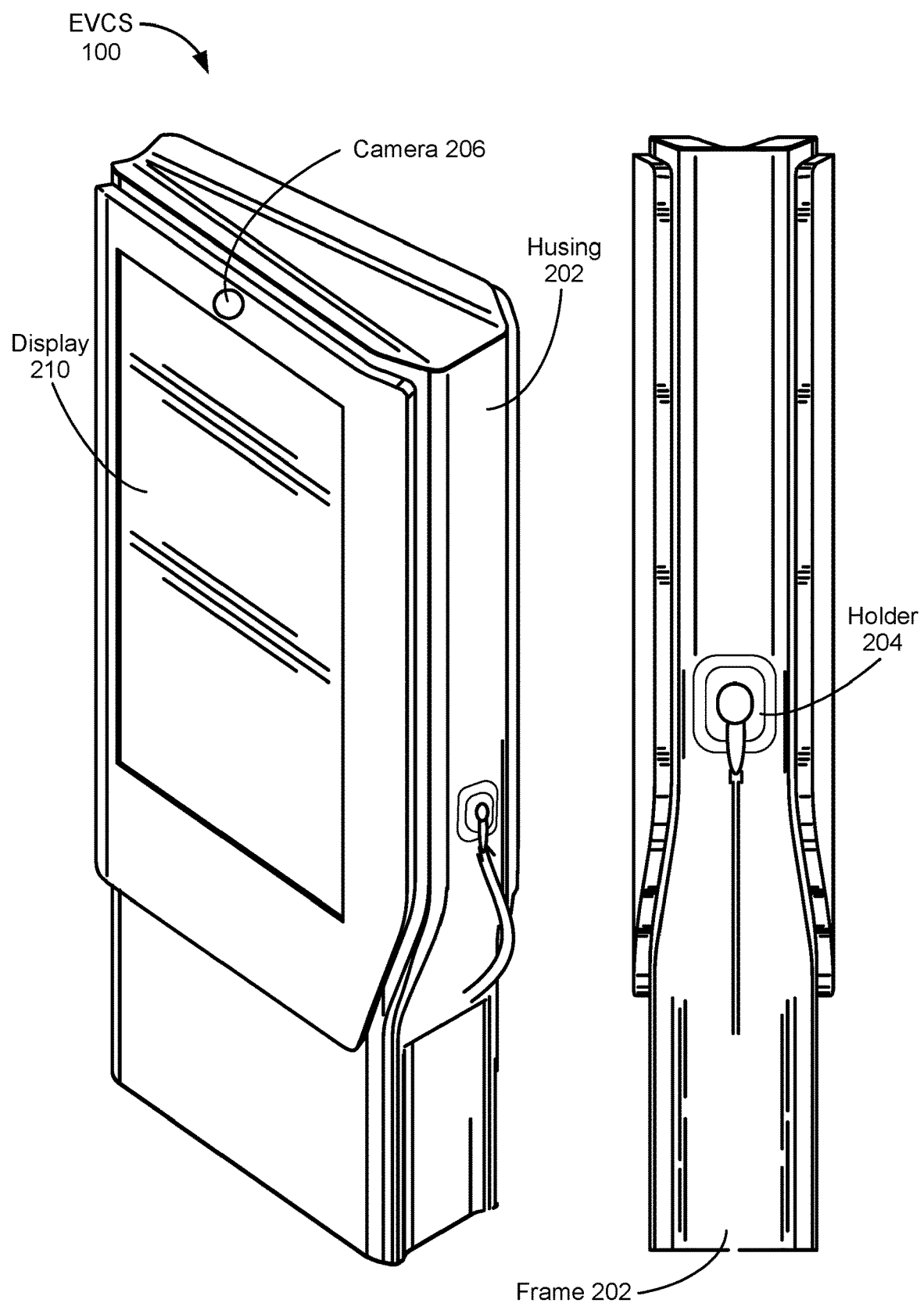
Figure 2C:
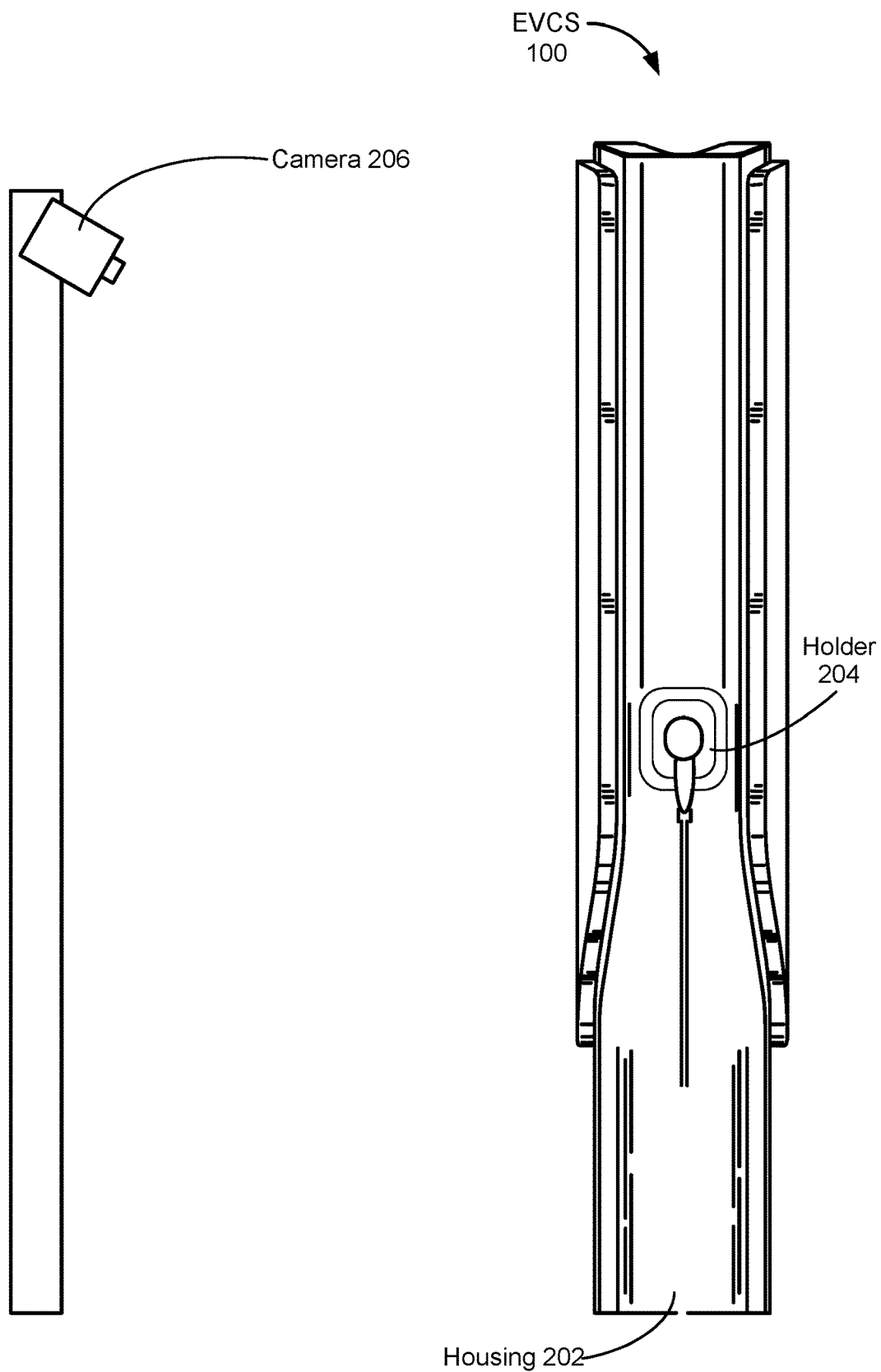

FIG. 2A is a mechanical drawing showing various views of an electric vehicle charging station (EVCS) 100, in accordance with some implementations. FIG. 2B is a mechanical drawing showing additional views of the EVCS 100 of FIG. 2A, in accordance with some implementations. FIG. 2C shows an alternative configuration of EVCS 100, in accordance with some implementations. FIGS. 2A-2C are discussed together below.

EVCS 100 includes a housing 202 (e.g., a body or a chassis) including a charging cable 102 (e.g., connector) configured to connect and provide a charge to an electric vehicle 110 (FIG. 1). An example of a suitable connector is an IEC 62196 type-2 connector. In some implementations, the connector is a "gun-type" connector (e.g., a charge gun) that, when not in use, sits in a holder 204 (e.g., a holster). In some implementations, the housing 202 houses circuitry for charging an electric vehicle 110. For example, in some implementations, the housing 202 includes power supply circuitry as well as circuitry for determining a state of a vehicle being charged (e.g., whether the vehicle is connected via the connector, whether the vehicle is charging, whether the vehicle is done charging, etc.).

The EVCS 100 further includes one or more displays 210 facing outwardly from a surface of the EVCS 100. For example, the EVCS 100 may include two displays 210, one on each side of the EVCS 100, each display 210 facing outwardly from the EVCS 100. In some implementations, the one or more displays 210 display messages (e.g., media content) to users of the charging station (e.g., operators of the electric vehicle) and/or to passersby that are in proximity to the EVCS 100. In some implementations, the panel 106a (and/or panel 106b) has a height that is at least 60% of a height of the housing 202 and a width that is at least 90% of a width of the housing 202. In some implementations, the panel 102 has a height that is at least 3 feet and a width that is at least 2 feet.

In some implementations, the EVCS 100 includes one or more panels that hold a display 210. The displays are large compared to the housing 202 (e.g., 60% or more of the height of the frame and 80% or more of the width of the frame), allowing the displays 210 to function as billboards, capable of conveying information to passersby. In some implementations, the displays 210 are incorporated into articulating panels that articulate away from the housing 202 (e.g., a sub-frame). The articulating panels solve the technical problem of the need for maintenance of the displays 210 (as well as one or more computers that control content displayed on the display). To that end, the articulating panels provide easy access to the entire back of the displays 210. In addition, in some implementations, the remaining space between the articulating panels (e.g., within the housing 202) is hollow, allowing for ample airflow and cooling of the displays 210.

The EVCS 100 further includes a computer that includes one or more processors and memory. The memory stores instructions for displaying content on the display 210. In some implementations, the computer is disposed inside the housing 202. In some implementations, the computer is mounted on a panel that connects (e.g., mounts) a first display (e.g., a display 210) to the housing 202. In some implementations, the computer includes a near-field communication (NFC) system that is configured to interact with a user's device (e.g., user device 112 of a user 114 of the EVCS 100).

In some implementations, the EVCS 100 includes one or more sensors (not shown) for detecting whether external objects are within a predefined region (area) proximal to the housing. For example, the area proximal to the EVCS 100 includes one or more parking spaces, where an electric vehicle 110 parks in order to use the EVCS 100. In some implementations, the area proximal to the EVCS 100 includes walking paths (e.g., sidewalks) next to the EVCS 100. In some implementations, the one or more sensors are configured to determine a state of the area proximal to the EVCS 100 (e.g., wherein determining the state includes detecting external objects). The external objects can be living or nonliving, such as people, kids, animals, vehicles, shopping carts, (kids) toys, etc. The one or more sensors can detect stationary or moving external objects. The one or more sensors of the EVCS 100 include one or more image (e.g., optical) sensors (e.g., one or more cameras 206), ultrasound sensor, depth sensor, IR/RGB camera, PIR, heat IR, proximity sensors, radar, and a tension sensor. The one or more sensors may be connected to the EVCS 100 or a computer system associated with the EVCS 100 via wired or wireless connections such as via a Wi-Fi connection or Bluetooth connection.

In some implementations, the housing 202 includes one or more lights configured to provide predetermined illumination patterns indicating a status of the EVCS 100. In some implementations, at least one of the one or more lights is configured to illuminate an area proximal to the EVCS 100 as a person approaches the area (e.g., a driver returning to a vehicle or a passenger exiting a vehicle that is parked in a parking spot associated with the EVCS 100).

In some implementations, the housing 202 includes one or more cameras 206 configured to capture one or more images of an area proximal to the EVCS 100. In some implementations, the one or more cameras 206 are configured to obtain video of an area proximal to the EVCS 100. For example, a camera may be configured to obtain a video or capture images of an area corresponding to a parking spot associated with the EVCS 100. In another example, another camera may be configured to obtain a video or capture images of an area corresponding to a parking spot next to the parking spot of the EVCS 100. In a third example, the camera 206 may be a wide angle camera or a 360° camera that is configured to obtain a video or capture images of a large area proximal to the EVCS 100, including a parking spot of the EVCS 100. As shown in FIG. 2B, the one or more cameras 206 may be mounted directly on a housing 202 of the EVCS 100 and may have a physical (e.g., electrical, wired) connection to the EVCS 100 or a computer system associated with the EVCS 100. Alternatively, as shown in FIG. 2C, the one or more cameras 206 (or other sensors) may be disposed separately from but proximal to the housing 202 of the EVCS 100. In some implementations, the camera 206 may be positioned at different locations on the EVCS 100 than what is shown in the figures. Further, in some implementations, the one or more cameras 206 include a plurality of cameras positioned at different locations on the EVCS 100.

The EVCS 100 includes a motor (e.g. motor 403, FIG. 4) within the housing 202. The motor, when energized, is configured to retract at least a portion of the charging cable 102. In some embodiments, the charging cable is retracted into the housing 202. In some embodiments, the charging cable is retracted into a spool external to the housing 202. In some embodiments, the charging cable is retracted into a separate housing. For simplicity, the remainder of this disclosure refers to retraction of the cable into the housing 202. In some implementations, the motor is energized when retraction criteria are met. For example, if the charging cable 102 is improperly returned to the housing 202 or if a user does not return the charging cable 102 to the housing 202, the motor is energized to retract at least a portion of the charging cable 102 into the housing 202. The charging cable 102 is retracted to prevent tripping hazards and to improve the overall experience of a user. In some implementations, a determination that the retraction criteria are met is based on the data captured by the one or more sensors. The retraction criteria are described in detail below in reference to FIGS. 6A and 6B.

Figure 3:
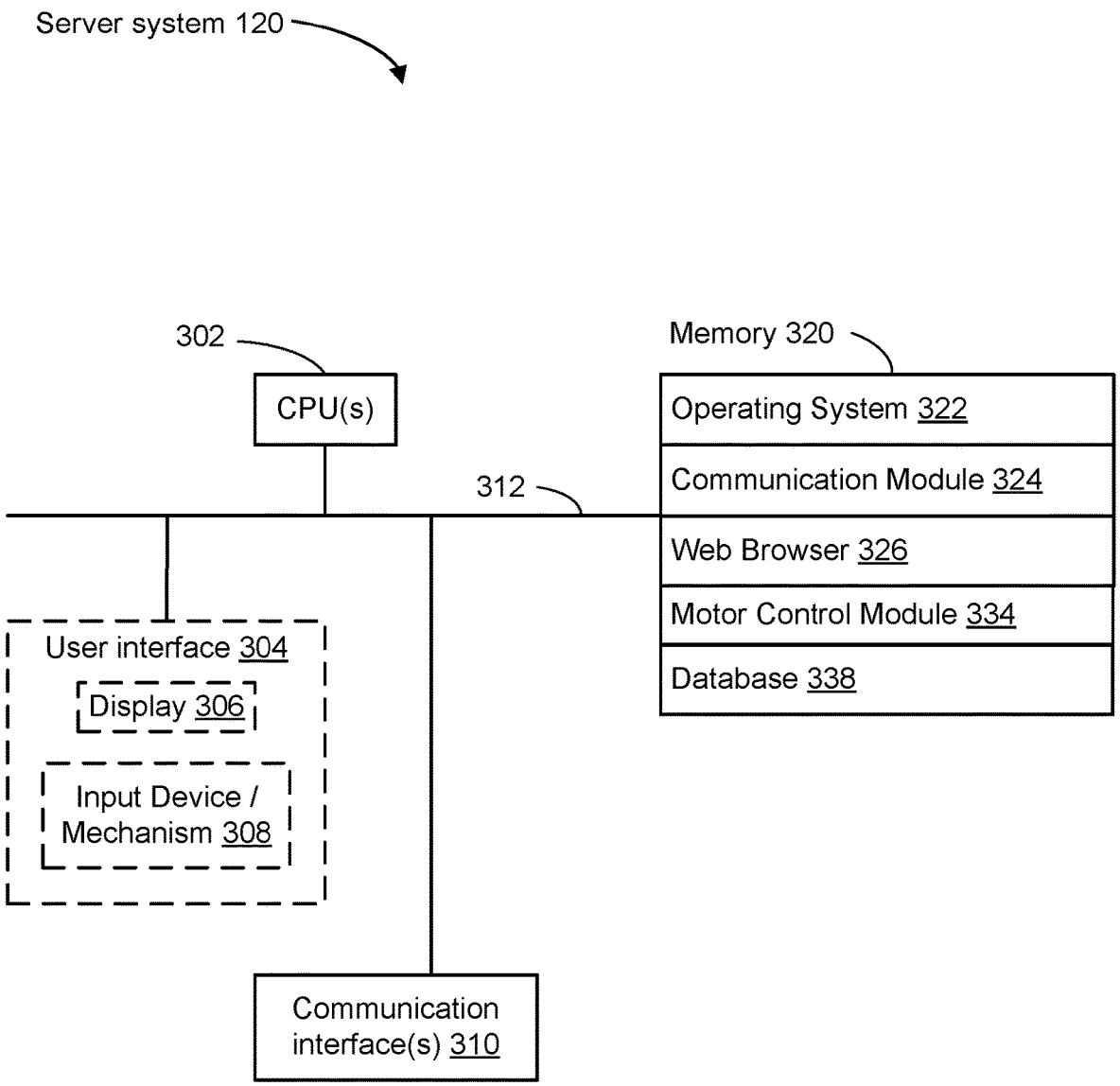
FIG. 3 is a block diagram of a server system in accordance with some implementations.

FIG. 3 is a block diagram of a server system 120, in accordance with some implementations. Server system 120 may include one or more computer systems (e.g., computing devices), such as a desktop computer, a laptop computer, and a tablet computer. In some implementations, the server system 120 is a data server that hosts one or more databases (e.g., databases of images or videos), models, or modules or may provide various executable applications or modules. The server system 120 includes one or more processing units (processors or cores, CPU(s)) 302, one or more network or other communications network interfaces 310, memory 320, and one or more communication buses 312 for interconnecting these components. The communication buses 312 optionally include circuitry (sometimes called a chipset) that interconnects and controls communications between system components. The server system 120 typically includes a user interface 304. The user interface 304 may include a display device 306 (e.g., a screen or monitor). In some implementations, the server system 120 includes one or more input devices 308 such as a keyboard, mouse, and/or other input buttons. Alternatively or in addition, in some implementations, the display device 306 includes a touch-sensitive surface, in which case the display device 306 is a touch-sensitive display.

The memory 320 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. In some implementations, the memory 320 includes one or more storage devices remotely located from the processors 302. The memory 320, or alternatively the non-volatile memory devices within the memory 320, includes a non-transitory computer-readable storage medium. In some implementations, the memory 320 or the computer-readable storage medium of the memory 320 stores the following programs, modules, and data structures, or a subset or superset thereof:

- an operating system 322, which includes procedures for handling various basic system services and for performing hardware dependent tasks;
- a communications module 324, which is used for connecting the server system 120 to other computers and devices via the one or more communication network interfaces 310 (wired or wireless), such as the Internet, other wide area networks, local area networks, metropolitan area networks, and so on;
- a web browser 326 (or other application capable of displaying web pages), which enables a user to communicate over a network with remote computers or devices;
- a motor control module 334 that includes one or more instructions for energizing or forgoing energizing the motor of an EVCS (e.g., in some embodiments, data from one or more sensors at or near an EVCS is passed to the server system 120, which makes a decision as to whether to retract the cable and returns the decision to the EVCS 100);
- database 338 for storing images of vehicles, backgrounds, and/or objects. In some implementations, the server system 120 receives one or more images captured at an EVCS 100 and stores them in database 338.

In some implementations, the memory 320 may store thresholds and other criteria, which are compared against metrics and/or characteristics determined from a processed image or data from one or more sensors of an EVCS 100.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 320 stores a subset of the modules and data structures identified above. Furthermore, the memory 320 may store additional modules or data structures not described above.

Although FIG. 3 shows a server system 120, FIG. 3 is intended more as a functional description of the various features that may be present rather than as a structural schematic of the implementations described herein. In practice, and as recognized by those of ordinary skill in the art, items shown separately could be combined and some items could be separated.

Figure 4:
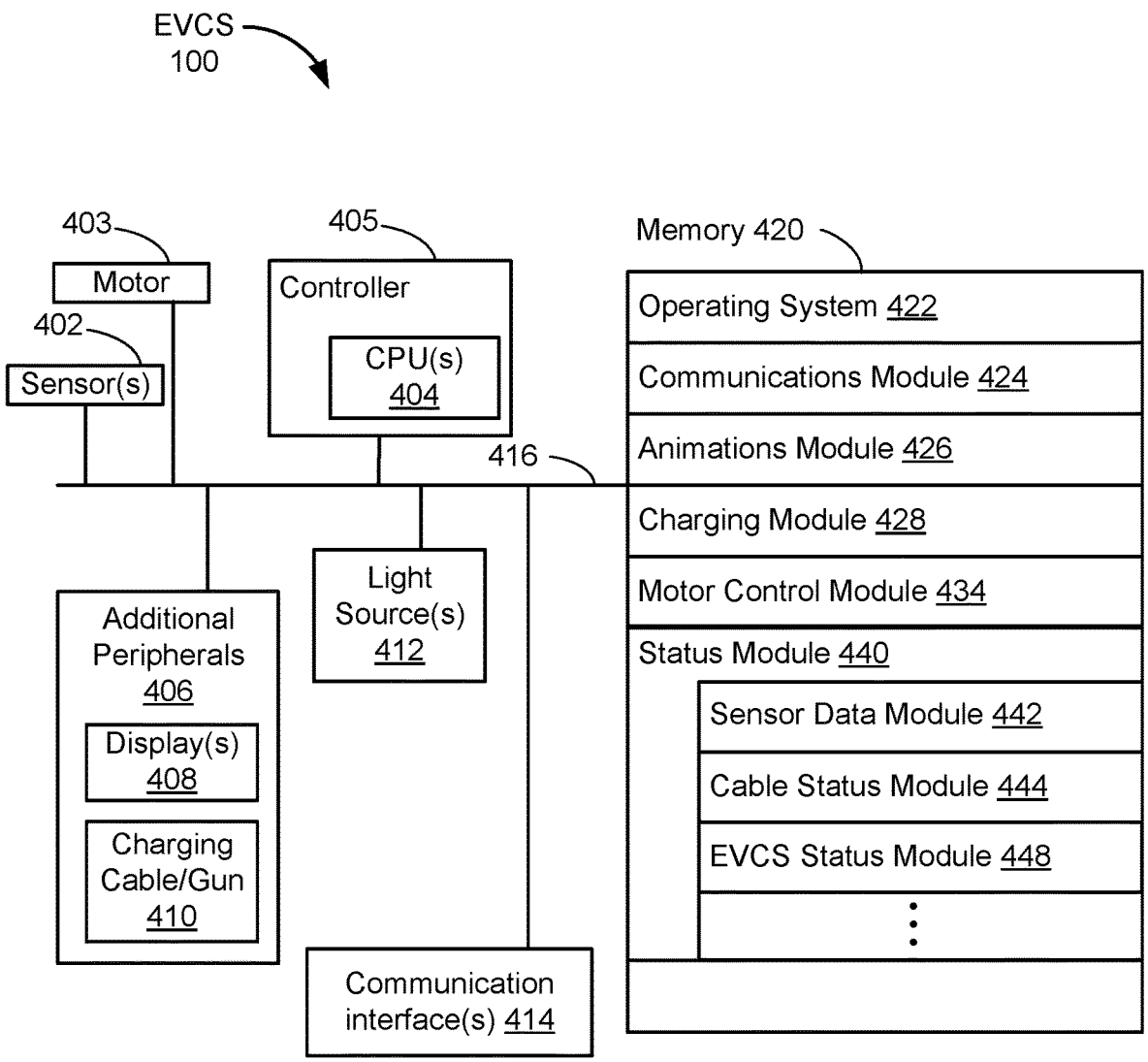
FIG. 4 is a block diagram of a charging station for an electric vehicle in accordance with some implementations.

FIG. 4 is a block diagram of an EVCS 100 (FIGS. 1 and 2A through 2C) for charging an electric vehicle, in accordance with some implementations. The EVCS 100 typically includes a motor 403 (configured to retract a portion of a charging cable), a controller 405 that includes one or more processing units (processors or cores) 404, one or more network or other communications network interfaces 414, memory 420, one or more light sources 412, one or more sensors 402, additional peripherals 406, and one or more communication buses 416 for interconnecting these components. The communication buses 416 optionally include circuitry (sometimes called a chipset) that interconnects and controls communications between system components. In some implementations, the memory 420 stores instructions for performing (by the one or more processing units 404) a set of operations, including determining a status of the EVCS 100, wherein the status indicates a state of an electric vehicle 110 at the charging station. Note that the controller used to energize the motor to retract a portion of the charging cable, as described with respect to method 800, may be the same or different from the controller that controls other operations of the EVCS 100 (e.g., controls animations). In addition, in various embodiments, the controller used to energize the motor may be embodied as a one or more processors or cores, a field programmable gate array (FPGA) or an application specific integrated circuit (ASIC). Moreover, the controller may be embodied as software, hardware, firmware, or a combination thereof.

EVCS 100 typically includes additional peripherals 406 such as one or more displays (corresponding to displays 210 shown in FIGS. 2A and 2B) for displaying content, and a charging cable 410 (e.g., charging cable 102 shown in FIGS. 2A, and 2B, also referred to as a charging gun) for connecting the EVCS 100 to an electric vehicle for charging the electric vehicle. In some implementations, the displays 408 may be a touch-sensitive display that is configured to detect various swipe gestures (e.g., continuous gestures in vertical and/or horizontal directions) and/or other gestures (e.g., a single or double tap) or to detect user input via a soft keyboard that is displayed when keyboard entry is needed.

The user interface may also include one or more sensors 402 such as cameras (e.g., camera 206, described above with respect to FIGS. 2A and 2B), ultrasound sensors, depth sensors, infrared cameras, visible (e.g., RGB or black and white) cameras, passive infrared sensors, heat detectors, infrared sensors, proximity sensors, or radar. In some implementations, the one or more sensors 402 are for detecting whether external objects are within a predefined region proximal to the housing, such as living and nonliving objects, and/or the status of the EVCS 100 (e.g., available, occupied, etc.) in order to perform an operation, such as retracting the charging cable safely and carefully.

The memory 420 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. In some implementations, the memory 420 includes one or more storage devices remotely located from the processors 404, such as database 338 of server system 120 that is in communication with the EVCS 100. The memory 420, or alternatively the non-volatile memory devices within the memory 420, includes a non-transitory computer-readable storage medium. In some implementations, the memory 420 or the computer-readable storage medium of the memory 420 stores the following programs, modules, and data structures, or a subset or superset thereof:

- an operating system 422, which includes procedures for handling various basic system services and for performing hardware dependent tasks;
- a communications module 424, which is used for connecting the EVCS 100 to other computers and devices via the one or more communication network interfaces 414 (wired or wireless), such as the Internet, other wide area networks, local area networks, metropolitan area networks, and so on;
- an animations module 426 for animating the one or more light sources 412 to provide predetermined illumination patterns or to provide illumination for passersby and users of the EVCS 100;
- a charging module 428 for charging an electric vehicle (e.g., measuring how much charge has been delivered to an electric vehicle, commencing charging, ceasing charging, etc.);
- motor control module 434 that includes one or more instructions for energizing or forgoing energizing the motor; and
- a status module 440 for monitoring a charging status of the EVCS 100 (e.g., a status of the EVCS 100 with respect to charging of an electric vehicle or its ability/inability to charge an electric vehicle).

In some implementations, the memory 420 stores metrics, thresholds, and other criteria, which are compared against the measurements captured by the one or more sensors 402. For example, data obtained from a PIR sensor of the one or more sensors 402 can be compared with baseline data to detect that an object is in proximity the EVCS 100.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 420 stores a subset of the modules and data structures identified above. Furthermore, the memory 420 may store additional modules or data structures not described above.

Although FIG. 4 shows an EVCS 100, FIG. 4 is intended more as a functional description of the various features that may be present rather than as a structural schematic of the implementations described herein. In practice, and as recognized by those of ordinary skill in the art, items shown separately could be combined and some items could be separated.

Figure 5:
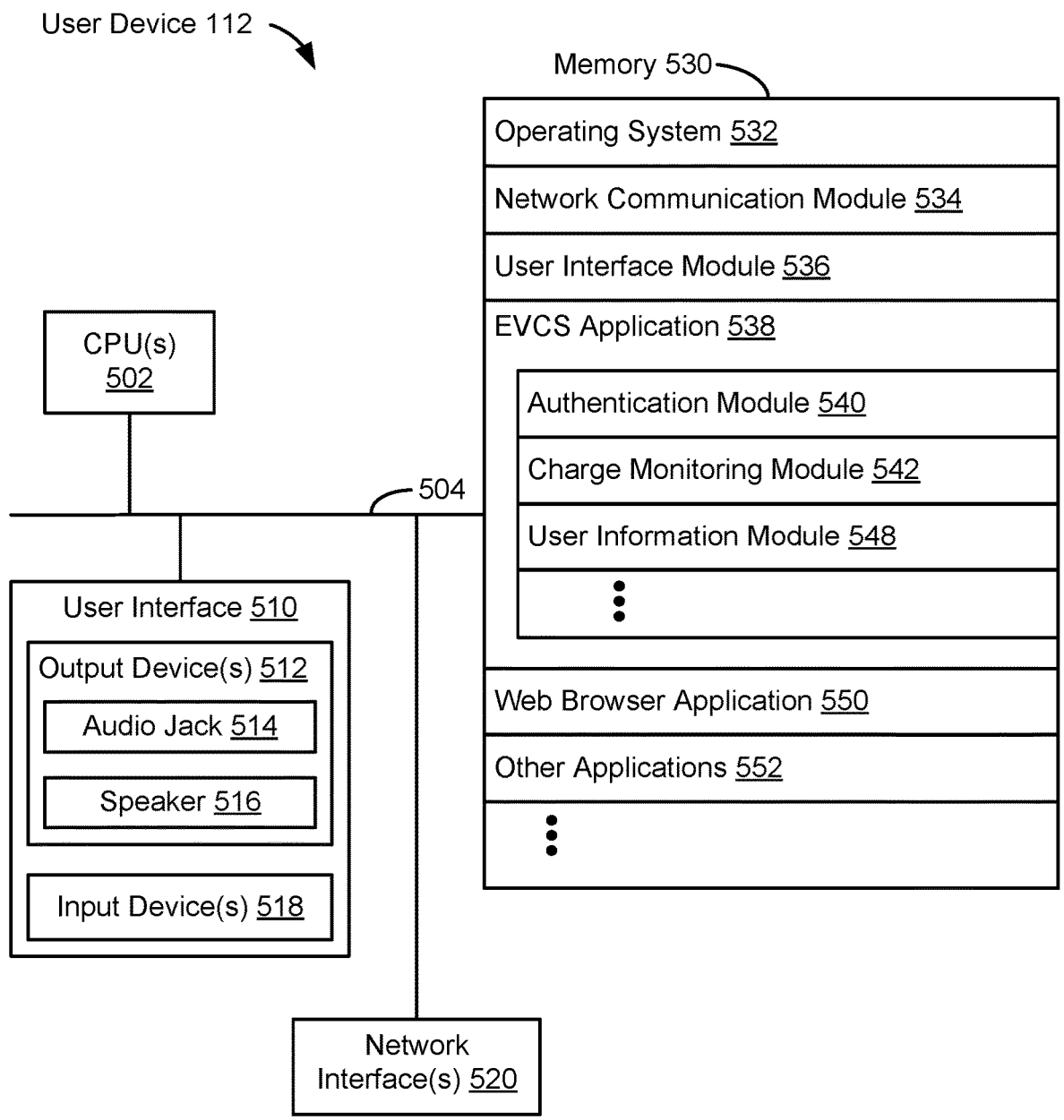
FIG. 5 is a block diagram of a user device in accordance with some implementations.

FIG. 5 is a block diagram of a user device 112 of a user 114 in accordance with some implementations. In some implementations, the user 114 is associated with (e.g., an operator of) an electric vehicle 110 at EVCS 100. Various examples of the computing device 112 include a cellular-capable smart device such as a smartphone, a smart watch, a laptop computer, a tablet computer, and other computing devices that have a processor capable of connecting to the EVCS 100 via a communications network (e.g., network 122).

The user device 112 typically includes one or more processing units (processors or cores) 502, one or more network or other communications network interfaces 520, memory 530, and one or more communication buses 504 for interconnecting these components. The communication buses 504 optionally include circuitry (sometimes called a chipset) that interconnects and controls communications between system components. The user device 112 typically includes a user interface 510. The user interface 510 typically includes a display (e.g., a screen or monitor). In some implementations, the user device 112 includes input devices 518 such as a keyboard, mouse, and/or other input buttons. Alternatively or in addition, in some implementations, the user device 112 includes a touch-sensitive surface, in which case the display is a touch-sensitive display. In some implementations, the touch-sensitive surface is configured to detect various swipe gestures (e.g., continuous gestures in vertical and/or horizontal directions) and/or other gestures (e.g., single/double tap). In computing devices that have a touch-sensitive surface (e.g., a touch-sensitive display), a physical keyboard is optional (e.g., a soft keyboard may be displayed when keyboard entry is needed). Furthermore, user device 112 may also include a microphone and voice recognition software to supplement or replace the keyboard.

The user interface 510 also includes one or more output devices 512 such as an audio output device 514, such as speakers 516 or an audio output connection 514 (e.g., audio jack) for connecting to speakers, earphones, or headphones.

The memory 530 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. In some implementations, the memory 530 includes one or more storage devices remotely located from the processors 502. The memory 530, or alternatively the non-volatile memory devices within the memory 530, includes a non-transitory computer-readable storage medium. In some implementations, the memory 530 or the computer-readable storage medium of the memory 530 stores the following programs, modules, and data structures, or a subset or superset thereof:

- an operating system 532, which includes procedures for handling various basic system services and for performing hardware dependent tasks;
- a network communication module 534, which is used for connecting the user device 112 to other computers and devices via the one or more communication network interfaces 520 (wired or wireless), such as the Internet, other wide area networks, local area networks, metropolitan area networks, and so on;
- user interface module 536 for providing user interfaces for the user to interact with the user device 112 via applications on the user device 112 and the operating system 532 of the user device 112;
- EVCS application 538 for communicating with an EVCS 100 or a server system that supports the EVCS 100. The EVCS application 538 includes authentication module 540 for authenticating the user device 112, so that the user device 112 can access (e.g., log into) a user profile (e.g., user account) on the EVCS application 538, a charge monitoring module 542 for providing updates on a charge status of an electric vehicle 110 that is associated with the user profile and using (e.g., plugged into, being charged by, parked at) EVCS 100 (e.g., status updates such as "Your vehicle is 70% charged", "Your vehicle has completed charging", "Your vehicle is fully charged", "Your free-charge time is up in 15 minutes"), and a user information module 548 that allows a user to create, delete, or update their profile (e.g., a user may update a profile to include a make and model of their vehicle);
- a web browser application 550 for accessing the internet and accessing websites on the internet, including providing functionalities on the EVCS application 538 via a website accessed through web browser application 550; and
- other applications 552 that the user 114 may have installed on the user device 112 or that may have been included as default applications on the user device 112.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 530 stores a subset of the modules and data structures identified above. Furthermore, the memory 530 may store additional modules or data structures not described above.

Although FIG. 5 shows a user device 112, FIG. 5 is intended more as a functional description of the various features that may be present rather than as a structural schematic of the implementations described herein. In practice, and as recognized by those of ordinary skill in the art, items shown separately could be combined and some items could be separated.

Figure 6A:
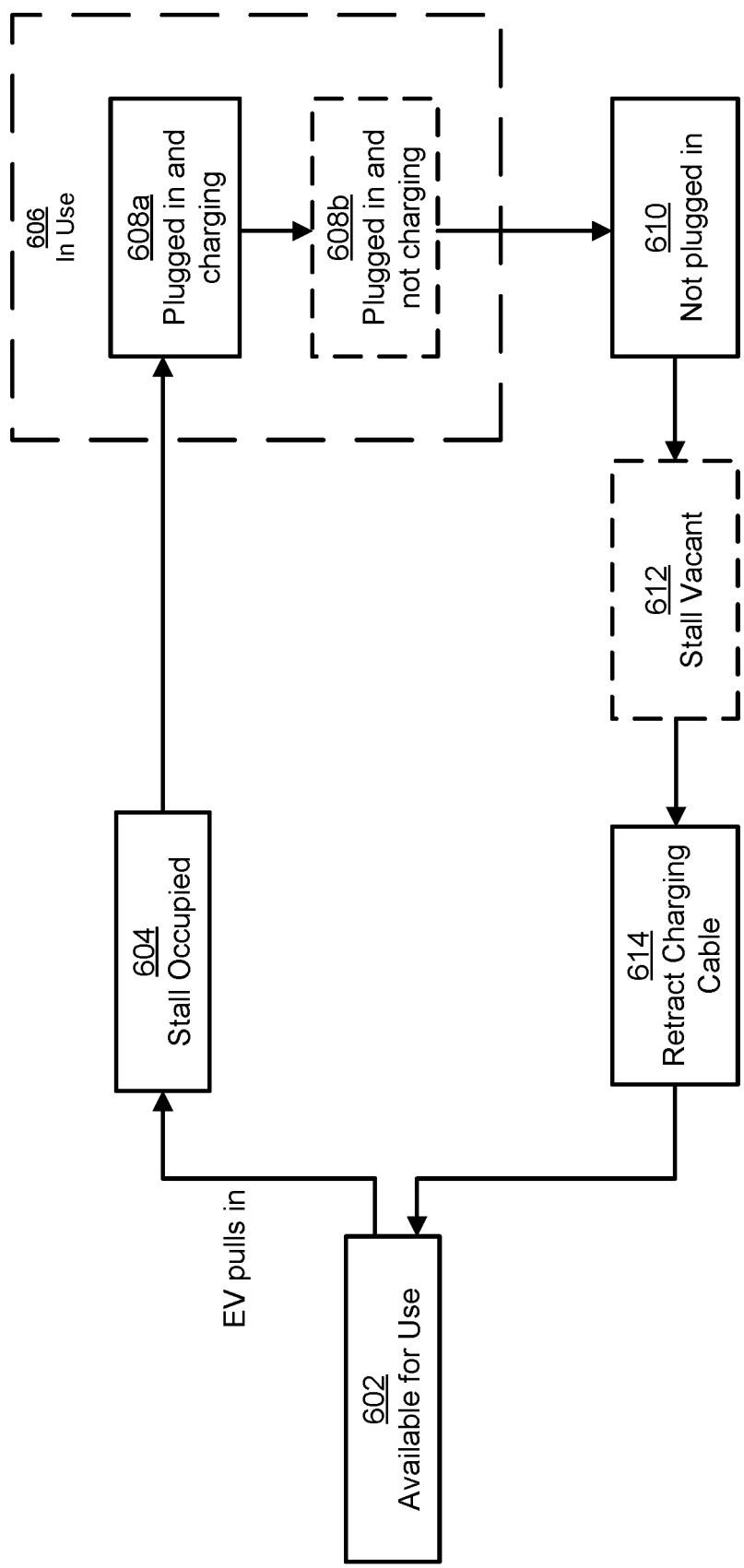
FIG. 6A illustrates statuses of a charging station for an electric vehicle in accordance with some implementations.

FIG. 6A illustrates statuses of an EVCS 100 in accordance with some implementations (e.g., statuses of the EVCS 100 with respect to charging of an electric vehicle or its ability/inability and or availability/unavailability to charge an electric vehicle). When the EVCS 100 is operational (e.g., not broken, under repair, or undergoing maintenance), the status of the EVCS 100 is set to available 602 when the parking spot (e.g., stall) associated with the EVCS 100 is empty and the EVCS 100 is not currently charging a vehicle. When an electric vehicle 110 pulls into the stall, the stall becomes occupied and the status of the EVCS 100 changes to occupied 604 even though the EVCS 100 is not yet in use (e.g., not charging the electric vehicle).

The status of the EVCS 100 is set to in use 606 when the electric vehicle 110 is plugged into (e.g., connected to) the EVCS 100 and being charged 608a by the EVCS 100. For example, an operator (e.g., driver) of the electric vehicle 110 can plug in the charging cable 102 (FIG. 2A) of the EVCS 100 and charge the electric vehicle 110. While the electric vehicle 110 is connected to and being charged by the EVCS 100, its status is set to in use 606. Alternatively, the EVCS 100 is considered to be in use 606 when the electric vehicle 110 is plugged into the EVCS 100 and not being charged 608b by the EVCS 100 (e.g., charging is complete and electric vehicle 110 has a substantially full battery (e.g., within a predefined threshold of 100%) but the operator has not returned to unplug and move the electric vehicle). In some implementations, a user may unplug the electric vehicle from the EVCS 100 while the electric vehicle is still being charged.

Once the operator unplugs (e.g., disconnects) the electric vehicle 110 from EVCS 100, the status of the EVCS 100 is changed from "in use" to "occupied" 604 as the EVCS 100 is still unavailable until the electric vehicle leaves the stall. After the operator has unplugged the charging cable 102 from the electric vehicle 110, the EVCS 100 can automatically retract (e.g., in response to detecting the change in status, and without user intervention), via a motor, at least a portion of the charging cable 102 into the housing 202 (FIG. 2A through 2C). Alternatively, the operator may not return the charging cable 102 to the EVCS 100, and the EVCS 100 retracts, via a motor, at least a portion of the cable 102 into the housing 202. For example, the operator may leave the charging cable 102 on the ground or improperly return the charging cable 102 to a holder 204 of the EVCS 100, and the EVCS 100 can retract at least a portion of the charging cable 102 into the housing 202. By retracting at least a portion of the charging cable 102 into the housing 202, the EVCS 100 removes the charging cable 102 as a potential tripping hazard, protects the charging cable 102 from damage, and improves the next user's experience (e.g., by not having the next user pick up the charging cable 102 from the ground). When the status of the EVCS 100 is set to retract charging cable 614, the EVCS 100 energizes the motor and retracts at least a portion of the charging cable 102 into the housing 202.

In some implementations, the EVCS 100, via the motor control module 434 (FIG. 4), energizes the motor when retraction criteria are met. In some implementations, the retraction criteria include a criterion that is met when the charging cable 102 is not coupled to an electric vehicle 110 and/or the at least one sensor does not detect an external object in the predefined region proximal to the housing 202. In various circumstances, the predefined region proximal to the housing 202 includes one or more parking spaces (where an electric vehicle 110 parks in order to use the EVCS 100 and adjacent parking spaces), walking paths (e.g., sidewalks) next to the EVCS 100, and/or other areas adjacent to the EVCS 100. In some implementations, detected external objects (e.g., people, animals, shopping carts, etc.) are obstacles near the EVCS 100 that will cause the EVCS 100 to delay or forgo energizing the motor. The external objects can be moving or stationary. In some implementations, the EVCS 100 detects whether external objects are in the predefined region proximal to the housing 202 by comparing data obtained by the one or more sensors of the EVCS 100 with a stored data (e.g., stored in memory 320; FIG. 3 or memory 420; FIG. 4). In some implementations, the EVCS 100 detects whether external objects are in the predefined region proximal to the housing 202 by comparing current image data obtained by the one or more sensors (e.g., camera 206; FIGS. 2A-2C) of the EVCS 100 with a stored background image. For example, the EVCS 100 may compare a current image captured with camera 206 to a stored background image to determine that an electric vehicle 110 is not present (e.g., determine that the current image matches the stored background image). Alternatively, the EVCS 100 may compare a current image captured with camera 206 to a stored background image to determine that an external object is present (e.g., determine that the current image does not match the stored background image). In this manner, trees and other static objects would not prevent retraction of the charging cable, whereas a shopping cart may prevent retraction of the charging cable (e.g., if the shopping cart is within the predefined region).

In some implementations, the retraction criteria include determining that an external object is not detected in the predefined region proximal to the housing 202 for at least a first time period (e.g., 20 sec., 30 sec., 1 min., 3 min., etc.). For example, after the charging cable 102 is unplugged, the EVCS 100 may energize the motor after waiting a first time period and determining that no external object was detected during the first time period. If an external object was detected during the first time period, the EVCS 100 restarts the first time period after the external object is no longer detected (e.g., leaves the predefined region proximal to the housing 202). In some implementations, the first time period is started when an electric vehicle 110 leaves the predefined region proximal to the housing 202 or leaves the stall (e.g., the parking space). For example, when the electric vehicle 110 leaves the stall, the status of the EVCS 100 is set to stall vacant 612 and the EVCS 100 begins the first time period. By energizing the motor when an external object is not detected, the EVCS 100 avoids entangling the charging cable 102 around an external object, tripping and/or damaging an external object, or damaging the charging cable 102.

Alternatively, in some implementations, the retraction criteria include after detecting an external object within the predefined region proximal to the housing 202 during the first time period, determining that the detected external object has remained (or is stationary) within the predefined region proximal to the housing 202, and waiting a second time period. The second time period is substantially greater than the first time period. For example, the second time period can be 15 min., 30 min., 1 hr., etc.). For example, a user may leave a shopping cart in the predefined region proximal to the housing 202 after unplugging the charging cable 102 and driving away in the electric vehicle 110 (e.g., leaving the parking stall). The EVCS 100 will detect the shopping cart within the first time period, and, after determining that the shopping cart is stationary (e.g., unattended), the EVCS 100 may wait until the second time period has elapsed before energizing the motor. In this way, the EVCS 100 retracts at least a portion of the charging cable 102 into the housing 202 after determining that the detected external object is not an obstacle (e.g., the external object is not obstructing the charging cable 102 from being retracted or the external object will not be harmed by retraction of the charging cable 102). However, if the detected external object is on the charging cable 102, the detected external object moves after the motor is energized, or a new external object is detected, the EVCS 100 forgoes or ceases energizing the motor.

In some implementations, the one or more sensors of the EVCS 100 include a sensor configured to determine a tension level in the charging cable 102 (e.g., by measuring a strain or electrical resistance in the charging cable 102). The EVCS 100 forgoes or ceases energizing the motor to retract at least a portion of the charging cable 102 into the housing 202 in accordance with a determination that a tension level in the charging cable 102 satisfies a threshold (e.g., the retraction criteria include a criterion that is not met when the tension level in the charging cable 102 satisfies the threshold). For example, an external object can be on top of the charging cable 102 or the charging cable 102 can be stuck in a position, thus causing the charging cable 102 to become taut when retracted. The EVCS 100 may determine, using the data from the one or more sensors may, that the tension level in the charging cable 102 satisfies the threshold, and, consequently, the EVCS 100 forgoes or ceases energizing the motor. In this way, the motor does not apply an additional force on the charging cable 102 that will damage the charging cable 102 or the external object. Alternatively, in some implementations, the EVCS 100 energizes the motor in accordance with a determination that the tension level does not satisfy the threshold (e.g., the retraction criteria include a criterion that is met when the tension level in the charging cable 102 does not satisfy the threshold). For example, the charging cable 102 can be laying on the ground and need to be retracted into the housing 202, and the retraction occurs when the force required to retract the charging cable 102 into the housing 202 is less than a force that would damage the charging cable 102.

In some implementations, after energizing the motor to retract at least a portion of the charging cable 102, the EVCS 100 forgoes (or ceases) energizing the motor in accordance with a determination that the at least one sensor detects an external object in the predefined region proximal to the housing 202 (e.g., the retraction criteria include a criterion that is not met when the at least one sensor detects an external object in the predefined region proximal to the housing 202). For example, while the motor is energized and before the charging cable 102 is completely or fully retracted into the housing 202, the EVCS 100 will forgo (or cease) energizing the motor if an external object is detected in the predefined region proximal to the housing 202.

In some implementations, the retraction criteria include a criterion that is met when a status of the EVCS 100 indicates that the EVCS 100 is not in use. In some implementations, the retraction criteria includes detecting a predefined change in the status of the EVCS 100. For example, in accordance with detecting a status of the EVCS 100 changing from occupied 604 to stall vacant 612, the EVCS 100 may energize the motor. Alternatively, in some implementations, while the EVCS 100 energizes the motor and a change in the status of the EVCS 100 is detected, the EVCS 100 forgoes (or ceases) energizing the motor. For example, if the motor is energized (and the charging cable 102 is being retracted) and an electric vehicle 110 enters the stall, the status of the EVCS 100 changes from available 602 to occupied 604 and the EVCS 100 forgoes (or ceases) energizing the motor. In this way, the motor does not damage the charging cable 102 and/or the electric vehicle 110 while it is energized. In some implementations, the statuses of the EVCS 100 include available, occupied (or vehicle present), in use, charging, and vacant (or no vehicle present).

When the stall is once again vacant, the EVCS has a status that indicates that it is available 602 for use. Transitions between any of these statuses correspond to a change in the status of EVCS 100 and may be detected by status module 440. In some implementations, EVCS 100 includes one or more sensors 402 that can detect whether the stall is occupied independently of an electric vehicle being connected to the EVCS 100. In some implementations, the status of the EVCS 100 is determined independently (e.g., separately) from whether or not the stall is occupied.

Figure 6B:
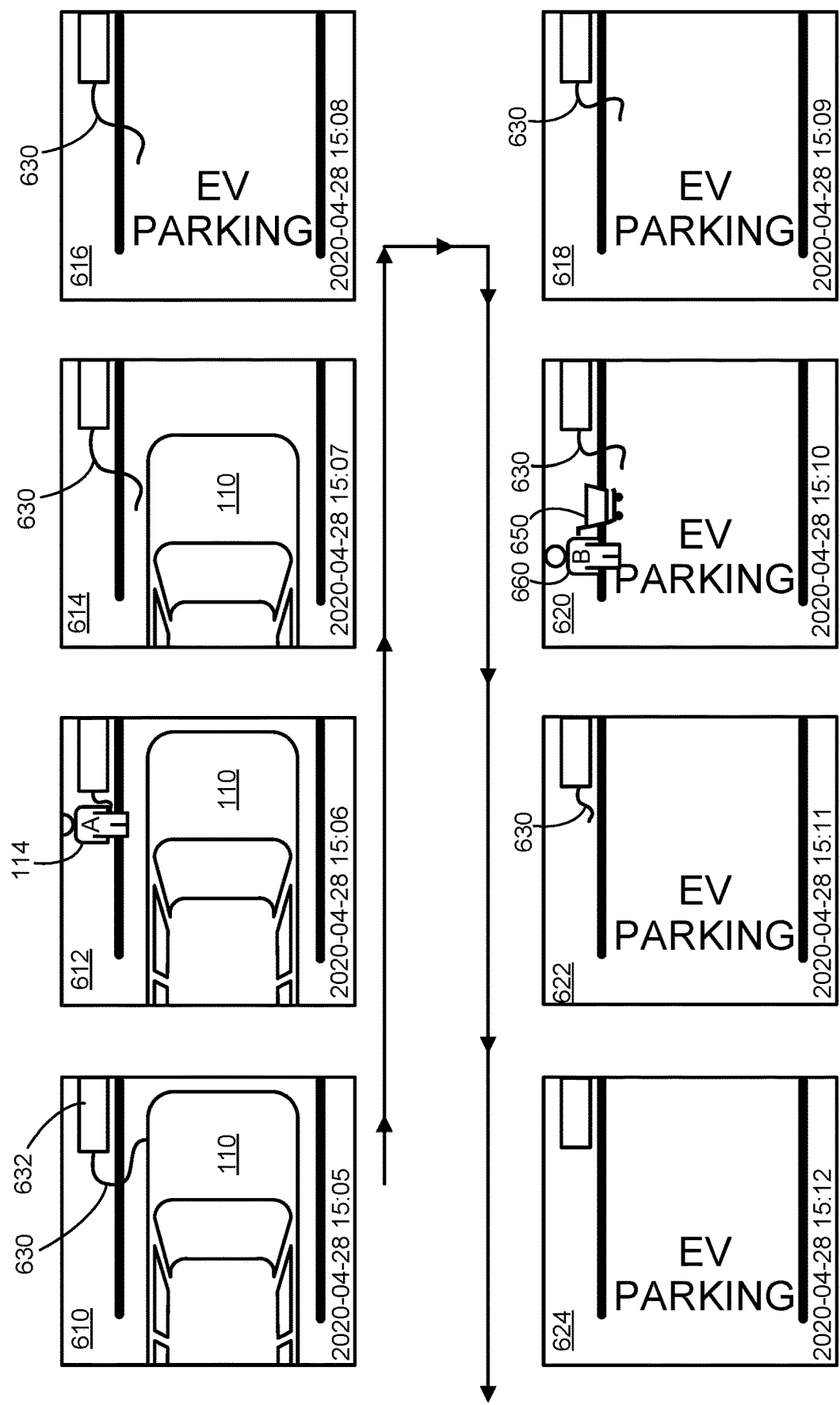
FIG. 6B illustrates frames from video captured at a charging station for an electric vehicle in accordance with some implementations.

FIG. 6B illustrates frames (not to scale) from video captured (e.g., by a camera, which is an example of a sensor, as described herein) at an EVCS 100 in accordance with some implementations. The frames 610 to 624 are obtained at an EVCS 632 (corresponding to EVCS 100) and show an area proximal to the EVCS 632, including a parking spot (e.g., stall) associated with the EVCS 632. Frame 610 shows that a charging cable 630 of EVCS 632 is connected to the electric vehicle 110 and the electric vehicle 110 is being charged by the EVCS 632. In some implementations, a user 114 may connect to the EVCS 632 remotely via a user device (e.g., user device 112 shown in FIG. 1). In some implementations, the user may interact with the EVCS 632 through one or more interfaces of the EVCS 632, such as through a touch screen display, an input keypad, or by removing a charging gun from a charging holster on the EVCS 632. Frame 612 shows that the user 114 has returned to her electric vehicle 110 and is interacting with the EVCS 632, in this case, by removing the charging cable 630 from the electric vehicle and thereby stopping charging of the electric vehicle 110. Frame 614 shows that electric vehicle 110 is pulling out of the stall while the charging cable 630 is left on the ground. This situation can occur when the user 114 is in a rush and drops the charging cable 630, forgets to return the charging cable 630 to the EVCS 632, or inappropriately returns the charging gun from the charging holster on the EVCS 632 causing it to fall to the ground. Alternatively, the charging cable 630 can be accidently pulled out by surrounding foot traffic.

As shown between frame 614 and frame 616, in some embodiments, the EVCS 632 does not immediately retract the charging cable 630. The EVCS 632 retracts the charging cable 630, by energizing a motor, based on a determination that the retraction criteria are met. The retraction criteria are discussed above in reference to FIG. 6A. Between frame 614 and frame 616, the electric vehicle 110 is detected leaving the parking stall and as such, the retraction criteria are not met and the EVCS 632 does not retract the charging cable 630. After the electric vehicle 110 is no longer detected by the EVCS 632, in some embodiments, the EVCS 632 waits a predetermined time period (e.g., a first time period) before retracting the charging cable 630. For example, between frame 616 and frame 618, the EVCS 632 waits approximately 1 min. (e.g., from 15:08 to 15:09 according to timestamps of frames 616 and 618) before energizing the motor and retracting the charging cable 630.

In some implementations, the EVCS 632 ceases retracting the charging cable 630 after detecting an external object within the predefined region proximal to the EVCS 632. For example, as shown between frame 618 and 620, the EVCS 632 stops retracting the charging cable 630 when a shopping cart 650 and another person 660 (external objects) are detected. Once the detected external objects are no longer within the predefined region proximal to the EVCS 632, the EVCS 632 will wait the first time before retracting the charging cable 630. For example, as shown between frame 620 and 622, the EVCS 632 waits approximately 1 min. (e.g., from 15:10 to 15:11 according to timestamps of frames 620 and 622) before reenergizing the motor and retracting the charging cable 630. Frame 624 shows an empty stall with the charging cable 630 retracted into the EVCS 632, and that the EVCS 632 is not currently in use. Frames 610 to 624 are examples of video frames 456 that are obtained at an EVCS (in this case, EVCS 632).

In some implementations, a subset of the frames obtained by the EVCS can be used to detect an external object within the predefined region proximal to the EVCS 632. In some embodiments, a status of the EVCS is determined based at least in part on a determination of whether external objects are detected within the predefined region proximal to the EVCS 632. For example, a change in the status of EVCS 632 may be detected sometime around frame 614 and frame 616 (e.g., around 15:07 and 15:08 according to timestamps of frames 614 and 616). The change in status may indicate that the electric vehicle 110 has left the parking stall and the stall is now vacant. In some implementations, another change in the status of EVCS 632 may be detected sometime around frame 620 (e.g., around 15:10 according to the timestamp of frame 620). The change in status may indicate that an external object (e.g., the other person 660 with a shopping cart 650) has been detected within the predefined region proximal to the EVCS 632.

Although frames 610 to 624 are shown as being captured from above (e.g., bird's eye view), it should be understood that frames 610 and 624 are examples of video frames 400 captured by an EVCS (e.g., EVCS 632, EVCS 100). To that end, additional examples are shown with respect to FIGS. 7A to 7D. In some implementations, as shown in FIGS. 2A-2C, the camera 206 is mounted directly on the housing 202 of the EVCS. In some implementations, the camera 206 may be disposed separate from a housing 202 of the EVCS 100 but still be connected to and considered as part of the EVCS 100. For example, the camera 206 of an EVCS 100 may be mounted on a post so that the EVCS 100 is also included in the video frames.

Figure 7A:
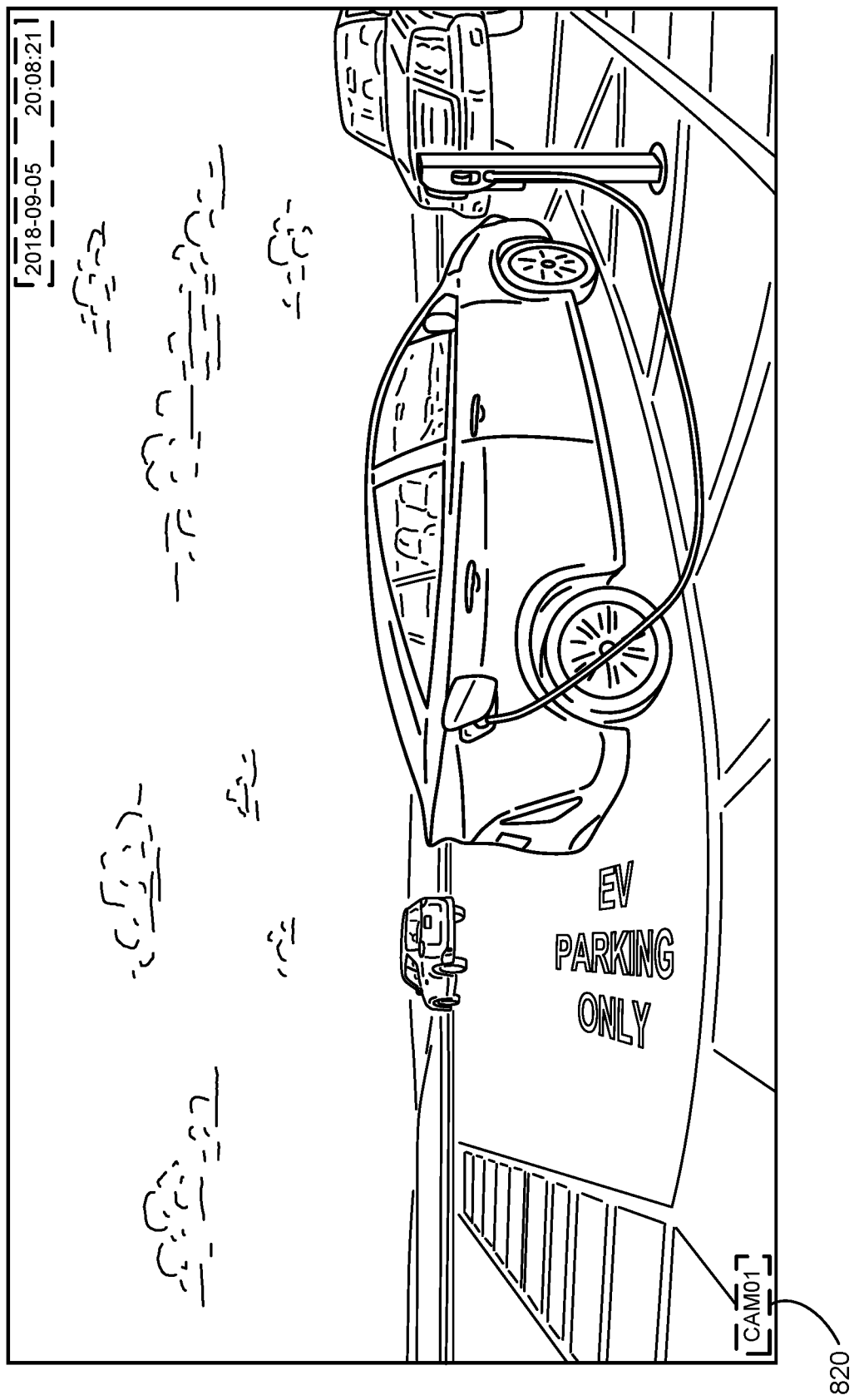
FIGS. 7A-7D illustrate examples of frames captured at an electric vehicle charging station, in accordance with some implementations.
Figure 7B:
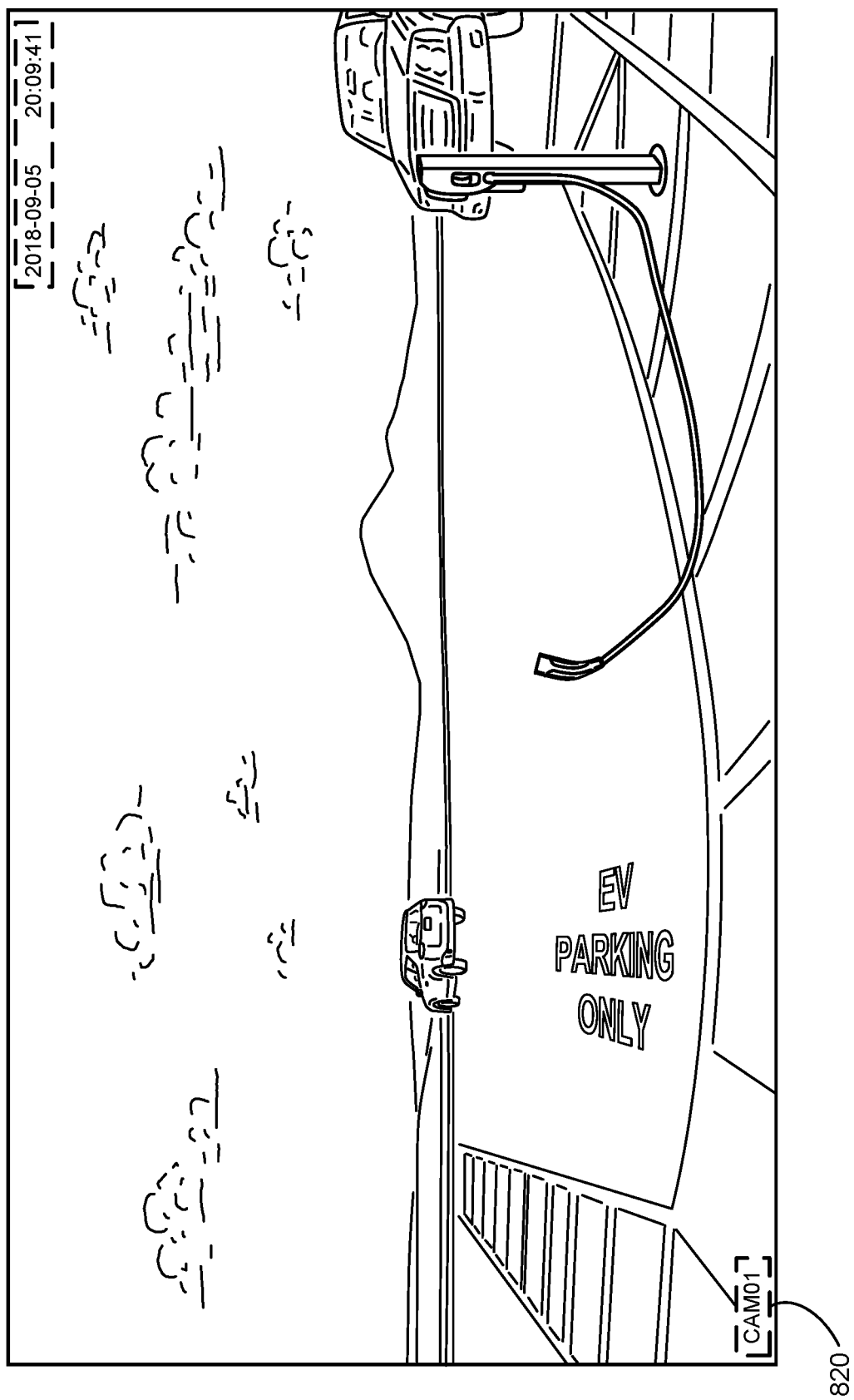
Figure 7C:
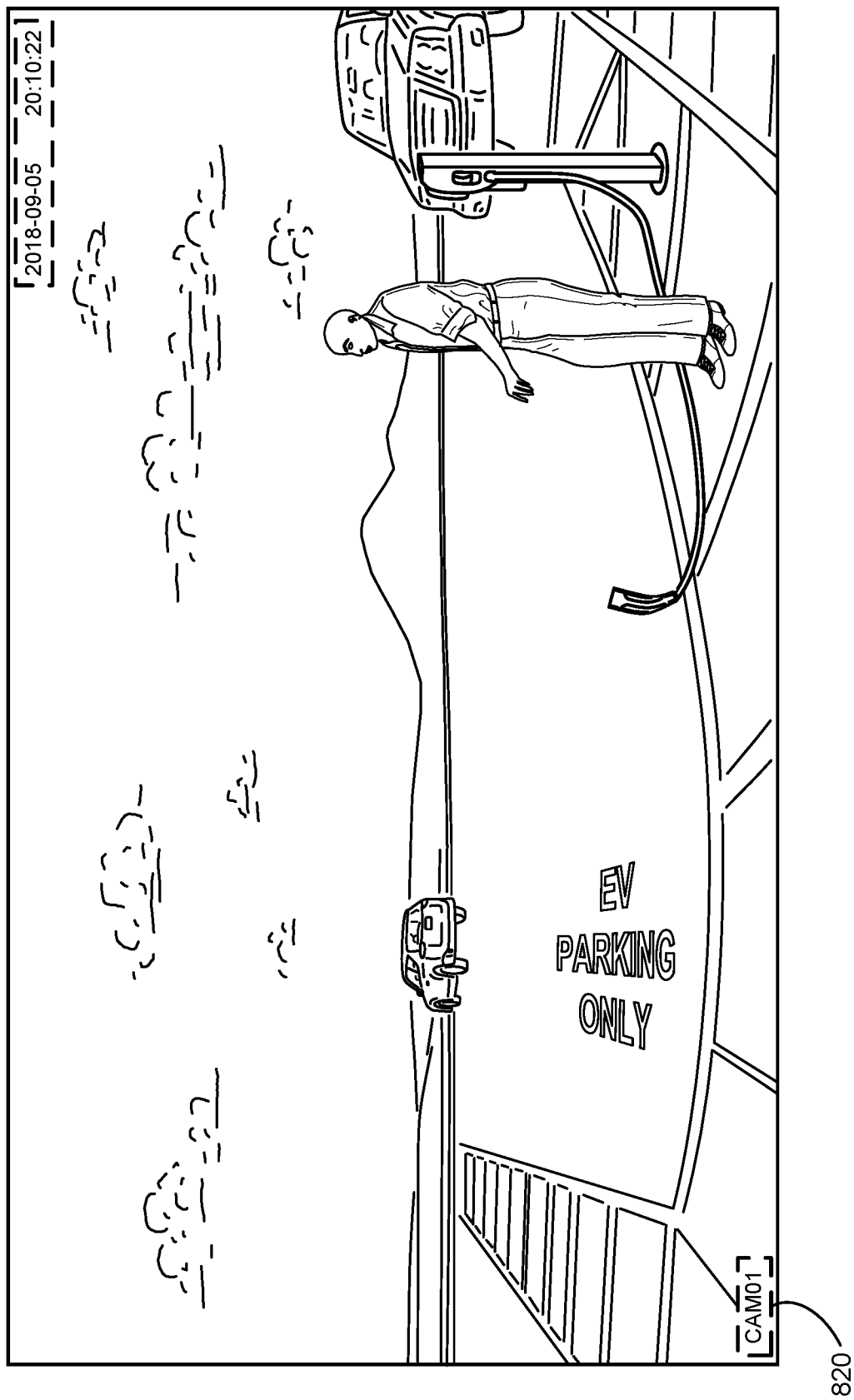
Figure 7D:
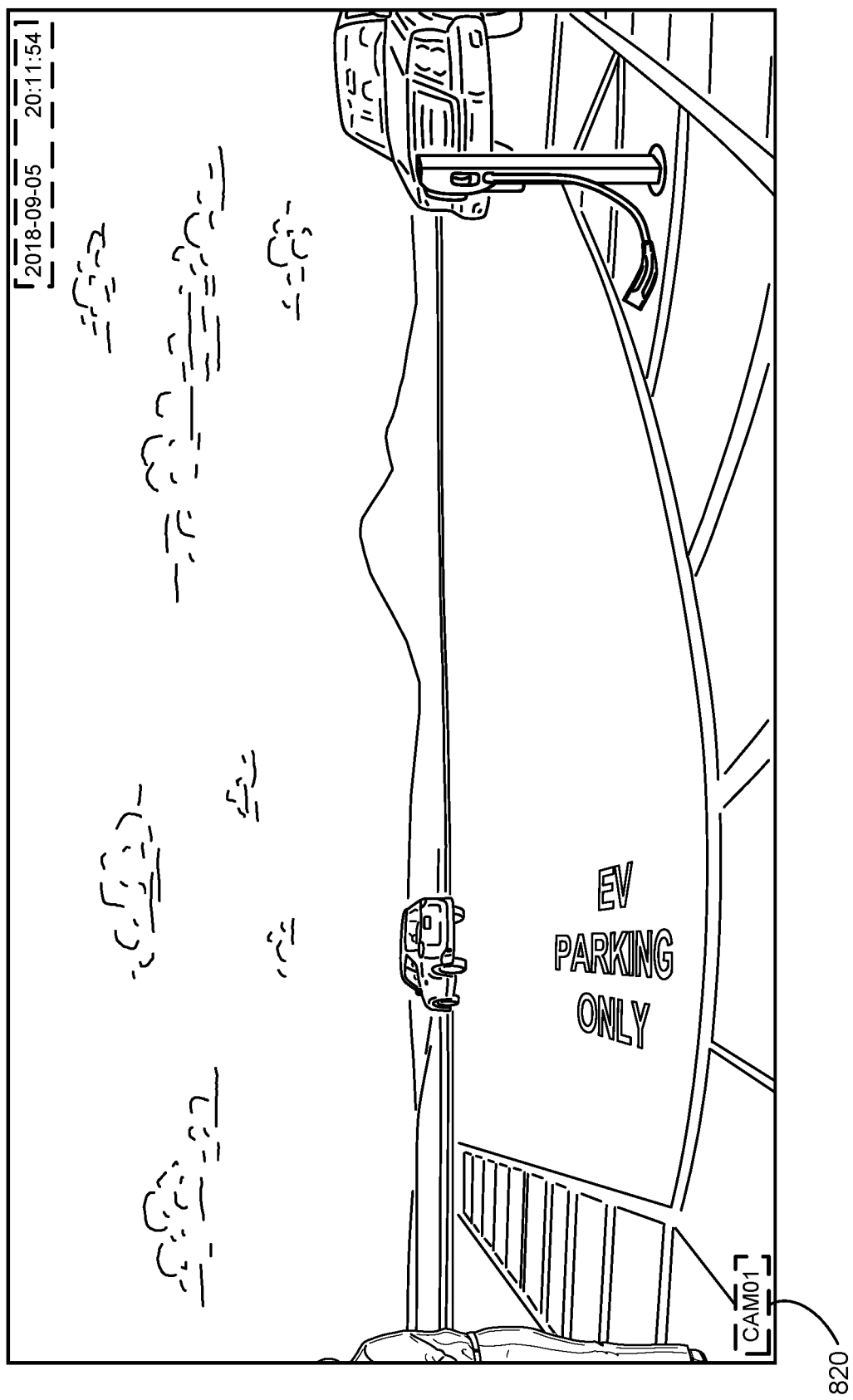

FIGS. 7A-7D illustrate examples of frames (e.g., images) captured at an electric vehicle charging station (e.g., an EVCS 100), in accordance with some implementations. In some implementations, as shown in FIG. 7A, multiple vehicles may be in proximity to an EVCS 100 with one vehicle disposed proximal to a camera that captured the frame (e.g., camera 206 of EVCS 100). In some implementations, as shown in FIG. 7B, the charging cable (e.g., charging cable 102 of the EVCS 100) is left in the middle of a parking stall. The EVCS 100 energizes a motor and begins retracting the charging cable 102 into the housing (e.g., housing 202 FIGS. 2A through 2C) after waiting a predetermined period of time (e.g., first time period). In some implementations, as shown in FIG. 7C, the image shows the EVCS 100 ceasing to retract the charging cable 102 after detecting that an external object (e.g., a person) walking along a sidewalk adjacent to the EVCS 100 (e.g., within the predefined region proximal to the EVCS 100). In some implementations, as shown in FIG. 7D, the EVCS 100 retracts the charging cable 102 after detecting that the external object (e.g., the person) has left the area adjacent to the EVCS 100 and waiting the predetermined time period.

Although the examples provided above describe the use of a camera (e.g., camera 206) for detecting the presence of an external object, different sensors of the one or more sensors (or combinations thereof), described above in FIGS. 2A through 2C and 4, can be used to detect the presence of an external object.

Figure 8A:
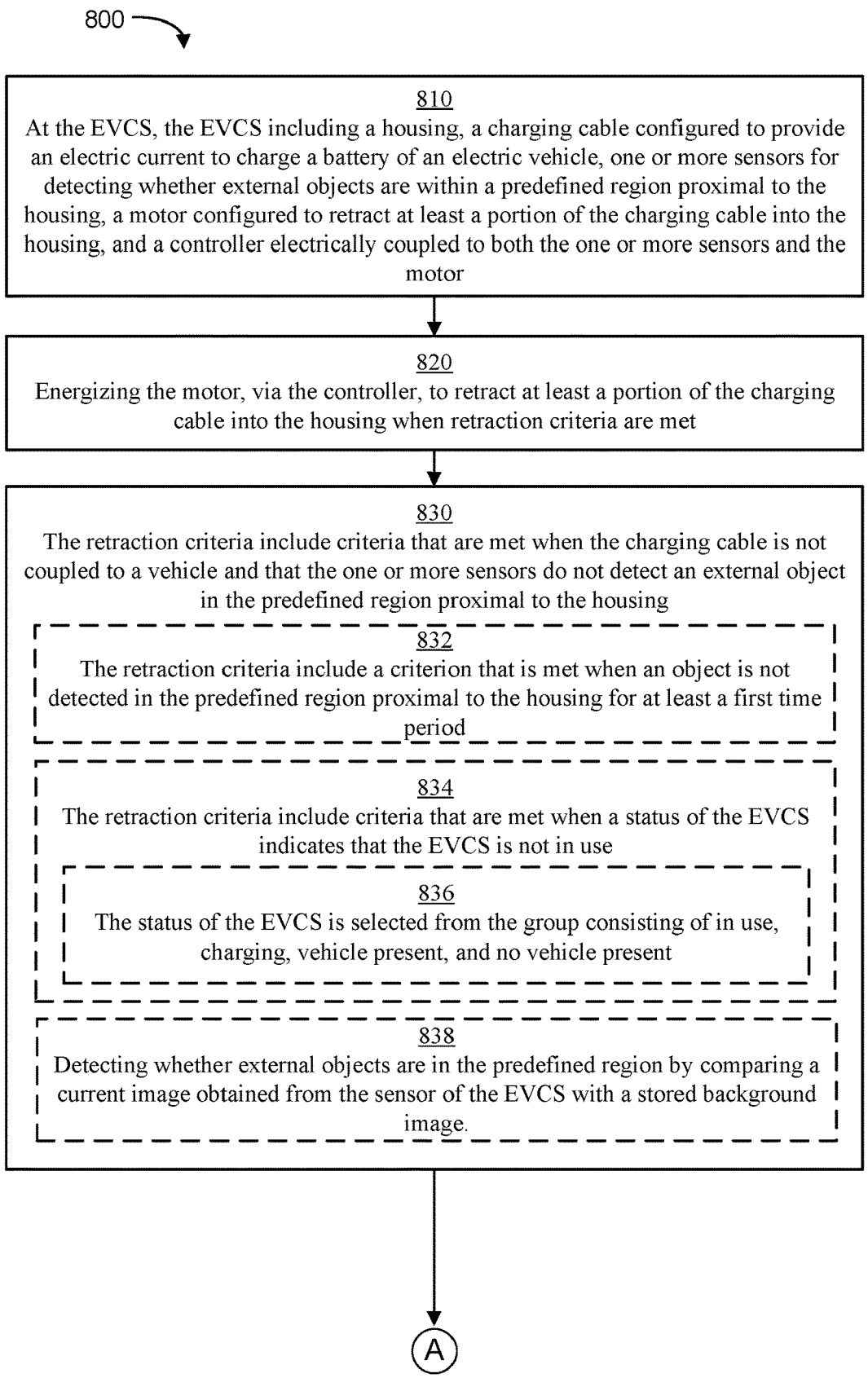
FIGS. 8A-8B illustrate a flowchart of a method of retracting the charging cable of a charging station, in accordance with some implementations.
Figure 8B:
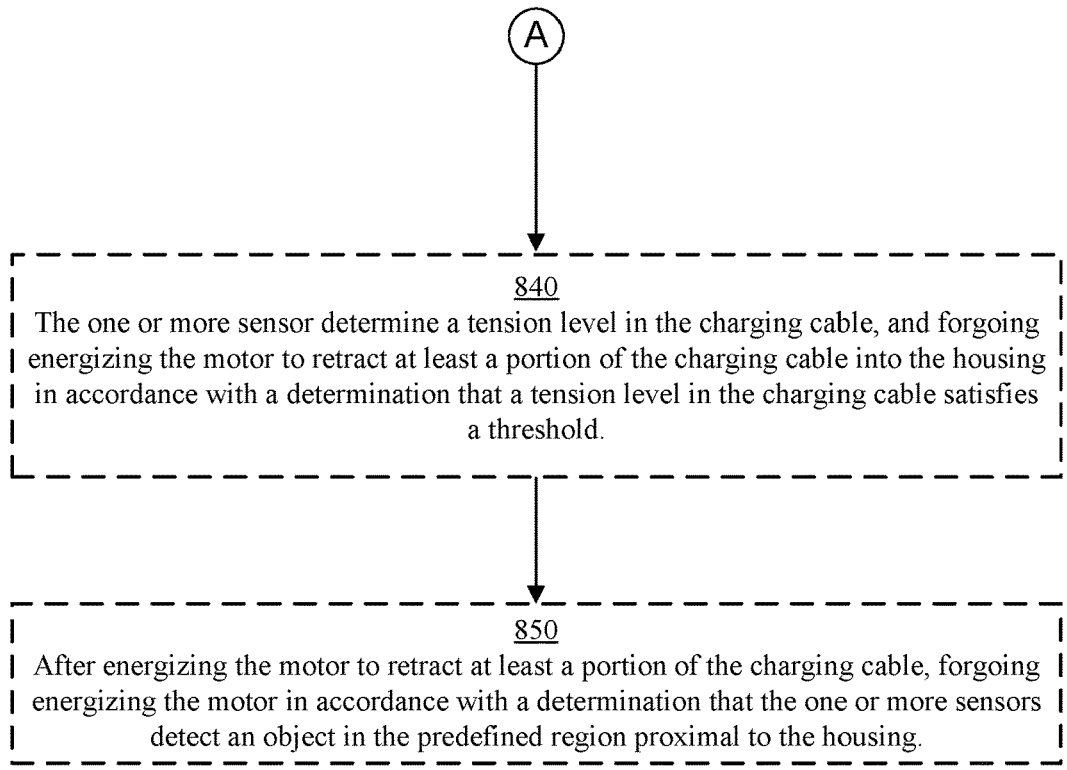

FIGS. 8A and 8B illustrate a flowchart of a method 800 of retracting a charging cable 102 of an electric vehicle charging station (e.g. EVCS 100; FIG. 1), in accordance with some implementations. As used herein, an electric vehicle is considered any vehicle that is configured to receive a charge from an EVCS 100 (e.g., a fully electric vehicle and/or a plug-in hybrid). The method 800 is performed (810) at the EVCS 100. The EVCS includes a housing (e.g., housing 202), a charging cable (e.g., charging cable 102) configured to provide an electric current to charge a battery of an electric vehicle, one or more sensors for detecting whether external objects are within a predefined region proximal to the housing 202, a motor configured to retract at least a portion of the charging cable 102 into the housing 202, and a controller (e.g., one or more processors (e.g., CPU(s) 404) and memory 420) electrically coupled to both the one or more sensors and the motor. In some implementations, a computer system (e.g., a computer system corresponding to server 120) is in communication and configured to work in conjunction with the EVCS 100. The computer system includes one or more processors (e.g., CPU(s) 302) and memory 320).

The method 800 includes energizing (820) the motor, via the controller, to retract at least a portion of the charging cable 102 into the housing 202 when retraction criteria are met (e.g., the method includes determining whether the retraction criteria are met using data from the one or more sensors). The retraction criteria include (830) criteria that are met when the charging cable 102 is not coupled to a vehicle and the one or more sensors do not detect an external object in the predefined region proximal to the housing 202. For example, the one or more sensors can include a PIR sensor that detects when an external object enters the predefined region proximal to the housing 202. In some implementations, the retraction criteria include (832) a criterion that is met when an object is not detected in the predefined region proximal to the housing 202 for at least a first time period. In some implementations, the first time period is counted when a vehicle leaves the predefined region proximal to the housing 202. For example, as described above in FIG. 6B, once an electric vehicle 110 pulls out of the parking stall, the EVCS 100 waits the first time period before energizing the motor (and retracts at least a portion of the charging cable 102).

In some embodiments, the method 800 includes, before energizing the motor, determining that the cable is at least partially extended from the housing. In some embodiments, the remainder of method 800 is performed in accordance with a determination that the cable is at least partially extended from the housing.

In some implementations, the retraction criteria include (834) a criterion that is met when a status of the EVCS 100 indicates that the EVCS 100 is not in use. In some implementations, the status of the EVCS 100 is continuously monitored (via the controller). In some implementations, at least one criterion of the retraction criteria is met when a predefined change in the status of the EVCS 100 is detected. For example, the EVCS 100 may energize the motor once its status changes from occupied to available. In some implementations, the status of the EVCS 100 is selected (836) from the group consisting of in use, charging, vehicle present, and no vehicle present. In some embodiments, the status of the EVCS 100 is selected from a predefined set of statuses, wherein the predefined set of statuses includes: an in use status, a charging status, a vehicle present status, and a no vehicle present status. In some implementations, method 800 incudes forgoing energizing the motor based on a predefined change in the status of the EVCS 100. For example, the EVCS 100 may forgo (or cease) energizing the motor once its status changes from available to occupied. Additional examples of the retraction criteria and the status of the EVCS 100 are described above in reference to FIGS. 6A and 6B.

In some implementations, the method 800 includes detecting (838) whether external objects are in the predefined region by comparing a current image obtained from the one or more sensors of the EVCS 100 with a stored background image. In some implementations, the one or more sensors include an image sensor (e.g., camera 206; FIGS. 2A through 2C) for obtaining video of a region proximal to the EVCS 100. For example, a stored (e.g., baseline) image of the parking stall in the predefined region proximal to the housing 202 can be compared with a current image captured by a camera 206 of the EVCS 100 to determine whether the parking stall is occupied. In some embodiments, the comparison is performed using a keypoint matching algorithm, a histogram comparison algorithm, a decision tree algorithm, or a combination thereof. In some implementations, the images are stored within memory 420 of the EVCS 100 or memory 320 of the server system 120.

In some embodiments, method 800 includes monitoring, over a period of time, using the one or more sensors, the predefined region proximal to the EVCS, to determine whether a respective external object has moved out of the predefined region. In some embodiments, the method 800 includes, in accordance with a determination that a respective external object has moved out of the predefined region, retracting, using the motor, at least a portion of the cable into the housing.

In some implementations, the one or more sensors determine a tension level in the charging cable 102, and the method 800 includes forgoing (840) or ceasing energizing the motor to retract at least a portion of the charging cable 102 into the housing 202 in accordance with a determination that a tension level in the charging cable 102 satisfies a threshold. For example, an external object (e.g., a shopping cart, a tire, a package, etc.) may be on the charging cable 102 and, when the EVCS 100 energizes the motor, the one or more sensors determine that the tension level (e.g., pulling force of the motor on the charging cable 102) satisfies the threshold and forgoes or ceases energizing the motor. Alternatively, while energizing the motor, the charging cable 102 can catch on an object or otherwise become stuck and the one or more sensors may determine that the tension level satisfies the threshold and forgoes or ceases energizing the motor. In some implementations, the method 800 includes energizing the motor in accordance with a determination that the tension level does not satisfy the threshold. In other words, the EVCS 100 may energize the motor when there is no excessive pulling force on the charging cable 102.

In some implementations, the method 800 includes, after energizing the motor to retract at least a portion of the charging cable 102, forgoing (850) energizing the motor in accordance with a determination that the one or more sensors detect an object in the predefined region proximal to the housing 202. In other words, if an external object is detected while the charging cable 102 is being retracted and before the charging cable 102 is completely or fully retracted into the housing 202, the EVCS 100 will forgo (or cease) energizing the motor.

It will be understood that, although the terms first, second, etc., are, in some instances, used herein to describe various elements, these elements should not be limited by these terms. These terms are only used to distinguish one element from another. For example, a first widget could be termed a second widget, and, similarly, a second widget could be termed a first widget, without departing from the scope of the various described implementations. The first widget and the second widget are both widget, but they are not the same condition unless explicitly stated as such.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. An electric vehicle charging station (EVCS), comprising:
   a housing;
   a charging cable configured to provide an electric current to charge a battery of an electric vehicle;
   one or more sensors for detecting whether a vehicle and external objects are within a predefined region proximal to the housing;
   a motor configured to retract at least a portion of the charging cable; and
   a controller electrically coupled to both the one or more sensors and the motor, wherein the controller is configured to energize the motor to retract at least a portion of the charging cable when retraction criteria are met, wherein the retraction criteria include criteria that are met when (i) the charging cable is not coupled to a vehicle and (ii) the one or more sensors do not detect a vehicle and do not detect an external object in the predefined region proximal to the housing.

2. The EVCS of claim 1, wherein the retraction criteria include a criterion that is met when an object is not detected in the predefined region proximal to the housing for at least a first time period.

3. The EVCS of claim 1, wherein the external objects detected by the one or more sensors comprise stationary objects and moving objects.

4. The EVCS of claim 1, wherein:
   the one or more sensors determine a tension level in the charging cable; and
   the controller is further configured to forgo energizing the motor to retract at least a portion of the charging cable in accordance with a determination that a tension level in the charging cable satisfies a threshold.

5. The EVCS of claim 1, wherein the controller is configured to, after energizing the motor to retract at least a portion of the charging cable, forgo energizing the motor in accordance with a determination that the one or more sensors detect an object in the predefined region proximal to the housing.

6. The EVCS of claim 1, wherein the retraction criteria include a criterion that is met when a status of the EVCS indicates that the EVCS is not in use.

7. The EVCS of claim 6, wherein the status of the EVCS is selected from the group consisting of in use, charging, vehicle present, and no vehicle present.

8. The EVCS of claim 1, wherein the controller detects whether external objects are in the predefined region by comparing a current image obtained from the one or more sensors of the EVCS with a stored background image.

9. The EVCS of claim 1, wherein retracting the at least portion of the charging cable includes retracting the at least portion of the charging cable into the housing.

10. A method for retracting a charging cable of an electric vehicle charging station (EVCS), comprising:
    at the EVCS, the EVCS including a housing, the charging cable configured to provide an electric current to charge a battery of an electric vehicle, one or more sensors for detecting whether a vehicle and external objects are within a predefined region proximal to the housing, a motor configured to retract at least a portion of the charging cable, and a controller electrically coupled to both the one or more sensors and the motor:
      energizing the motor, via the controller, to retract at least a portion of the charging cable when retraction criteria are met, wherein the retraction criteria include criteria that are met when (i) the charging cable is not coupled to a vehicle and (ii) the one or more sensors do not detect a vehicle and do not detect an external object in the predefined region proximal to the housing.

11. The method of claim 10, wherein the retraction criteria include a criterion that is met when an object is not detected in the predefined region proximal to the housing for at least a first time period.

12. The method of claim 10, wherein the external objects detected by the one or more sensors comprise stationary objects and moving objects.

13. The method of claim 10, wherein the one or more sensors determine a tension level in the charging cable, and the method further comprises:

forgoing energizing the motor to retract at least a portion of the charging cable in accordance with a determination that a tension level in the charging cable satisfies a threshold.

14. The method of claim 10, further comprising:
after energizing the motor to retract at least a portion of the charging cable, forgoing energizing the motor in accordance with a determination that the one or more sensors detect an object in the predefined region proximal to the housing.

15. The method of claim 10, wherein the retraction criteria include a criterion that is met when a status of the EVCS indicates that the EVCS is not in use.

16. The method of claim 15, wherein the status of the EVCS is selected from the group consisting of in use, charging, vehicle present, and no vehicle present.

17. The method of claim 10, further comprising:
detecting whether external objects are in the predefined region by comparing a current image obtained from the one or more sensors of the EVCS with a stored background image.

18. The method of claim 10, wherein retracting the at least portion of the charging cable includes retracting the at least portion of the charging cable into the housing.

* * * * *